(12) United States Patent
Subbotin et al.

(10) Patent No.: US 8,947,499 B2
(45) Date of Patent: Feb. 3, 2015

(54) RATE CONTROL FOR A COMMUNICATION

(71) Applicant: TangoMe, Inc., Palo Alto, CA (US)

(72) Inventors: Alexander Subbotin, Palo Alto, CA (US); Olivier Furon, Mountain View, CA (US); Shaowei Su, Beijing (CN); Yevgeni Litvin, Sunnyvale, CA (US); Xu Liu, San Jose, CA (US)

(73) Assignee: TangoMe, Inc., Mountain View, CA (US)

( * ) Notice: Subject to any disclaimer, the term of this patent is extended or adjusted under 35 U.S.C. 154(b) by 130 days.

(21) Appl. No.: 13/707,266

(22) Filed: Dec. 6, 2012

(65) Prior Publication Data

US 2014/0160227 A1    Jun. 12, 2014

(51) Int. Cl.
  *H04N 7/15*    (2006.01)
  *G10L 25/78*   (2013.01)
  *G10L 19/24*   (2013.01)

(52) U.S. Cl.
  CPC    *G10L 25/78* (2013.01); *H04N 7/15* (2013.01); *G10L 19/24* (2013.01)
  USPC ........ 348/14.12; 370/230; 370/235; 370/242; 370/252; 370/297; 379/88.01; 379/243; 380/200; 704/213; 704/249; 704/275; 709/224; 710/62

(58) Field of Classification Search
  CPC ................. H04N 7/17318; H04L 12/2801
  USPC ............... 348/41.12; 370/230, 234, 235, 242, 370/252, 297, 232; 379/88.01, 243; 380/200; 704/213, 249, 275; 709/224; 710/62
  See application file for complete search history.

(56) References Cited

U.S. PATENT DOCUMENTS

| 7,167,560 | B2 * | 1/2007 | Yu ................................ 380/200 |
| 7,643,417 | B2 * | 1/2010 | Van Nieuwenhuizen ..... 370/232 |
| 8,000,235 | B2 * | 8/2011 | Noy et al. .................... 370/230 |
| 8,094,578 | B2 * | 1/2012 | Nassor et al. ................ 370/252 |
| 8,199,684 | B2 * | 6/2012 | Eng ............................... 370/297 |
| 8,385,201 | B2 * | 2/2013 | Cohen et al. ................. 370/234 |
| 8,724,464 | B2 * | 5/2014 | Diab ............................. 370/235 |
| 8,838,856 | B2 * | 9/2014 | Partani et al. ................. 710/62 |
| 2003/0081756 | A1 * | 5/2003 | Chan et al. ................... 379/243 |
| 2003/0083875 | A1 * | 5/2003 | Brown et al. ................ 704/249 |
| 2003/0086541 | A1 * | 5/2003 | Brown et al. .............. 379/88.01 |
| 2003/0088403 | A1 * | 5/2003 | Chan et al. ................... 704/213 |
| 2004/0002865 | A1 * | 1/2004 | Chan et al. ................... 704/275 |
| 2010/0061251 | A1 * | 3/2010 | Nassor et al. ................ 370/242 |
| 2011/0022699 | A1 * | 1/2011 | Powell et al. ................ 709/224 |
| 2014/0160227 | A1 * | 6/2014 | Subbotin et al. ........... 348/14.12 |

* cited by examiner

*Primary Examiner* — Gerald Gauthier

(57) ABSTRACT

Methods and systems for communicating with rate control. A communication is sent and received from a first device to a second device over a network, wherein the communication comprises at least one audio stream and a second communication stream. A capacity of the network is probed at the first device for the sending and receiving the communication. A presence of a voice in the at least one audio stream is detected at the first device via a voice activity detection of the at least one audio stream. A rate limit is set for the sending and receiving the communication at the first device based on the capacity of the network and the detection of the presence of the at least one audio stream.

22 Claims, 4 Drawing Sheets

RATE CONTROL FOR A COMMUNICATION

BACKGROUND

Modern technologies allow for various methods and techniques for communicating between two devices. Such communications may be multimedia and may occur over a network. Various limitations may impose restrictions on the amount of data that may be sent in a given communication. The present technology seeks to over these restrictions.

Figure 1:
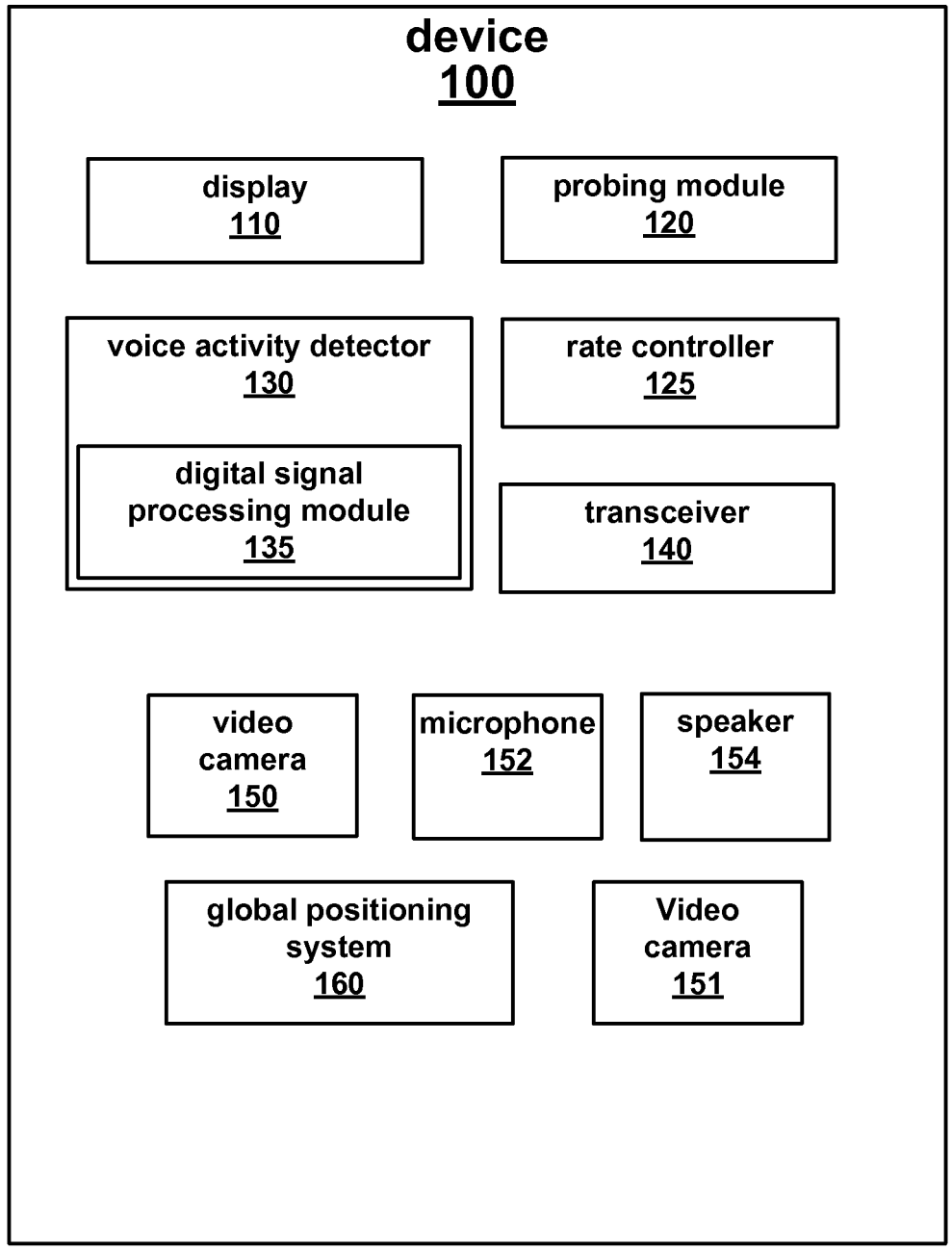
FIG. 1 illustrates a block diagram of an example device for communicating in accordance with embodiments of the present technology.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "receiving," "sending," "deriving," "probing," "detecting," "setting," "increasing," "changing," or the like, refer to the actions and processes of a computer system, or similar electronic computing device. The computer system or similar electronic computing device, such as a telephone, smartphone, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Rate Control for a Communication

Embodiments of the present technology are for rate control for a communication. The communication may be between two devices such as a cell phones, smart phones, computers, laptops, televisions, hand held electronic devices, etc. In one embodiment, the communication occurs over a network and is a two way communication that comprises both audio and video streams. The network may have limitation on its bandwidth or capacity for sending and receiving data. For example, the network may be a cellar network that employs electromagnetic radio signals. During a communication the signal strength may be variable over time. Therefore the present technology prioritizes how video is sent, specifically at which bit rate, according to the variable network capacity.

A multimedia communication that comprises an audio and video stream may attempt to send the video stream at a data rate as high as possible. This allows for the highest definition or resolution of the video being sent and received. One solution is to probe the capacity or bandwidth of the network to determine the maximum bit rate that may be sent for the communication. Some solutions employ a rate control algorithm that treat audio and video as binary streams and may or may not prioritize audio packets. However, a communication may suffer errors or losses when the communication is being transmitted at a maximum bit rate and then the capacity of the network decreases. This may lead to a saturation of the network capacity. In such a scenario, the audio signal may be lost. Thus while the video may become clearer at a higher resolution, a user may no longer be able to hear speech during the communication.

The present technology seeks to send video streams of a communication at a high bit rate while reducing the risk that an audio stream will be lost when the capacity of a network changes. In one embodiment, the device sending a communication will monitor or probe the network capacity during the communication. The device will also employ voice activity detection (VAD) of the audio stream to determine whether the presence of an audio stream, specifically the presence of a voice. The VAD may be able to detect or determine whether there is near end speech based on microphone input.

The device may then employ bit rate controllers and algorithms to set a rate limit based on the network capacity and the detection of the presence of the audio stream. In one embodiment, the rate limit is a static limit that is below that lowest measured capacity of the network. The rate limit may operate to ensure that the bit rate of the communication is always below the rate limit. In one embodiment, the rate limit may be continuously changed based on the variations in the network changing and thus the VAD detection changing. The bit rate of the video stream may be changed in response to the rate limit. For example, if the rate limit is reduced, then the bit rate of the video stream may be reduced to be just under or at the rate limit. In one embodiment, if the speech or the audio stream detected, then the bit rate stream of the video may be increased. If the speech or the audio stream is not detected, the bit rate stream of the video may be decreased. Thus the likelihood that the bit rate of the communication will exceed the variable capacity of the network is greatly reduced while allowing for a high resolution of video to be transmitted.

Methods and Systems for Rate Control for a Communication

FIG. 1 depicts an embodiment of device 100. Device 100 is configured for participation in a communication. The communication may comprise audio streams, video streams, pictures, text, and may be pre-recorded and sent or may be a live or a real time communication. In one embodiment, the communication is a two-way communication between two devices such that audio and video are continuously sent between the two devices during the communication. It should be appreciated that device 100 may be a smart phone, a cell phone, a desktop computer, a laptop, a notebook, a netbook, a hand held device, a personal digital assistant, a television, or similar electronic device capable of participating in multimedia digital communication.

In one embodiment, device 100 is able to participate in a video conference. In general, video conferencing allows two or more locations to interact via multi-way video and audio transmissions simultaneously.

The discussion below will first describe the components of device 100. The discussion will then describe the functionality of the components of device 100 during a video conference between devices. Moreover, the discussion will describe, among other things, the communication of video messaging.

Moreover, for clarity and brevity, the discussion will focus on the components and functionality of device 100. However, device 200 operates in a similar fashion as device 100. In one embodiment, device 200 is the same as device 100 and includes the same components as device 100.

Device 100 includes display 110, probing module 120, rate controller 125, voice activity detector 130, digital signal processing (DSP) module 135, transceiver 140, camera 150, microphone 152 and speaker 154. Device 100 optionally includes global positioning system 160.

Display 110 is configured for displaying video captured at device 200. In another embodiment, display 110 is further configured for displaying video captured at device 100. In one embodiment, display 110 is a touchscreen and is able to display a user interface with regions that can be pressed or selected by the user to initiate commands.

Transceiver 140 is for transmitting and receiving data related to a communication such as text, speech, audio, video, animations, etc. Transceiver 140 may operate to send and receive communications over a network to another device. For example, the network may be a cellar network such as 3G or 4G network. In other embodiments, the network may be a WiFi network, a Bluetooth network, a near field communication, or other network for sending and receiving electromagnetic radio signals.

Video camera 150 is an image capturing devices for capturing video or pictures at device 100. It should be appreciated that device 100 may also include an additional camera (e.g., camera 151) on a back face of device 100 facing opposite camera 150. Microphone 152 is for capturing audio at device 100. Speaker 154 is for generating an audible signal at device 100 such as the audio stream of a communication from another device. Global positioning system 160 is for determining a location of a device 100.

During a video conference, video camera 150 captures video at device 100. For example, video camera 150 captures video of user 205 as shown in the display of device 200. Microphone 152 may simultaneously captures audio signals corresponding to the captured video signal at device 100. Similarly, a second device may also be capturing audio and video.

Figure 2:
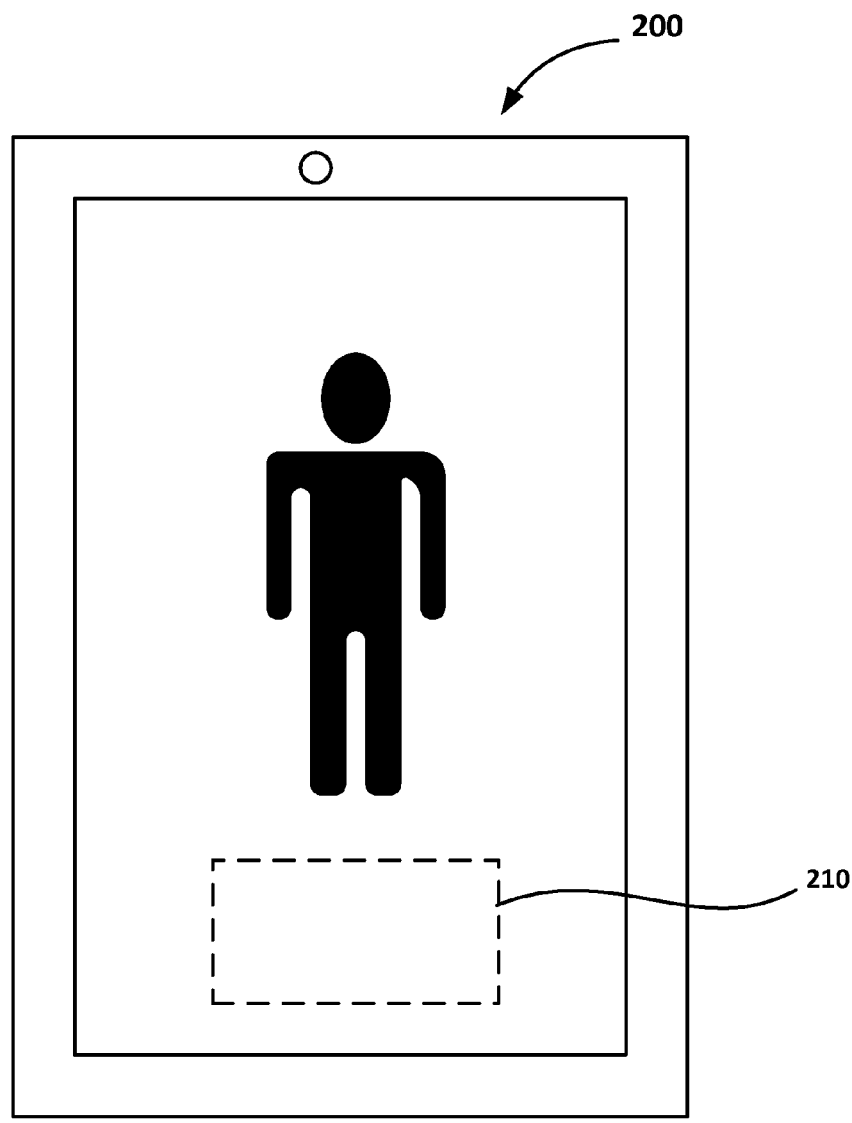
FIG. 2 illustrates a block diagram of an example device for communicating in accordance with embodiments of the present technology.
Figure 2:

The video and audio captured at device 100 are transmitted at a bit rate to the second device which then displays the video and plays the audio. Simultaneously, device 100 is receiving video and audio streams from the second device which then displays the video and plays the audio. Region 210 of FIG. 2 may display text that is sent or received during the communication or may alternatively comprises buttons or other controls employed by a user in the user interface.

In one embodiment, the audio signals captured at devices 100 and 200 are incorporated into the captured video. In another embodiment, the audio signals are transmitted separate from the transmitted video.

In one embodiment, during a communication probing module 120 is able to probe a network that connects device 100 to another device to determine the bandwidth or capacity of the network. Such capacity may be variable. Therefore, probing module 120 may continuously probe the network to determine its capacity. Probing module 120 may constantly probe the network or may probe the network in predetermined intervals such as once a minute, once a second, or several times a second. Data gathered by probing module 120 may be employed by device 100 to determine a maximum bit rate at which data may be sent or transmitted from device 100.

The maximum bit rate may be set by rate controller 125 which uses a rate control algorithm to determine or set a rate limit. Rate controller 125 may be referred to as a network rate control. For example, the probing module 120 may determine that the network capacity for device 100 to upload data is 100 bits per a second, rate controller 125 may then set a rate limit hat 100 bits per a second and data related to the communication is then sent at this rate. The video stream of the communication may comprise the majority of the bit rate compared to the audio stream and either the video stream may be scaled up or down such that the communication is transmitted at 100 bits per a second. This allows device 100 to transmit the communication such that the video is sent at a maximum resolution. However, because the network capacity is variable, at later point in the communication the network capacity may decrease to 90 bits per a second. If device 100 continues to transmit at 100 bits per a second, then a portion of the communication may be lost, corrupted, or experience another error. In one embodiment, the audio portion may be lost if device 100 transmits data at a rate higher than the network capacity will allow.

During the communication, voice activity detector 130 detects voice activity associated with the audio stream of the communication and specifically detects whether or not there is speech at the near end. Voice activity detector 130 may employ algorithms to make such detections and calculate probabilities. In one embodiment, voice activity detector 130 computes the probability of near end speech using a hidden Markov model using Viterbi decoding. The data gathered by probing module 120 and voice activity detector 130 is used by device 100 and rate controller 125 to set a rate limit. With data from both probing module 120 and voice activity detector 130, rate controller 125 may set a rate limit such that the transmitted data will not exceed the network capacity, or may set a rate limit such that the likelihood of the transmitted data exceeding the network capacity is greatly reduced compared to an embodiment that does not employ a voice activity detector 130.

In one embodiment, when there is there is near end speech, rate controller 125 may decrease or keep the video bit rate. In one embodiment, when there is no end speech, then rate controller 125 may increase the video bit rate.

In one embodiment, when there is near end speech, rate controller 125 may decrease or keep the audio bit rate. In one embodiment, when there is no end speech, then rate controller 125 may increase the audio bit rate.

In one embodiment, voice activity detector 130 employs a standard audio DSP such as DSP module 135. The DSP module 135 may be associated with the voice activity detector 130 and may be linked to rate controller 125. In one embodiment, when there is there is near end speech, decrease or keep the video bit rate Probing module 120, rate controller 125, voice activity detector 130, and DSP module 135 may be independent hardware components of device 100 or may be associated with hardware components of device 100 such as a central processing unit.

Figure 3:
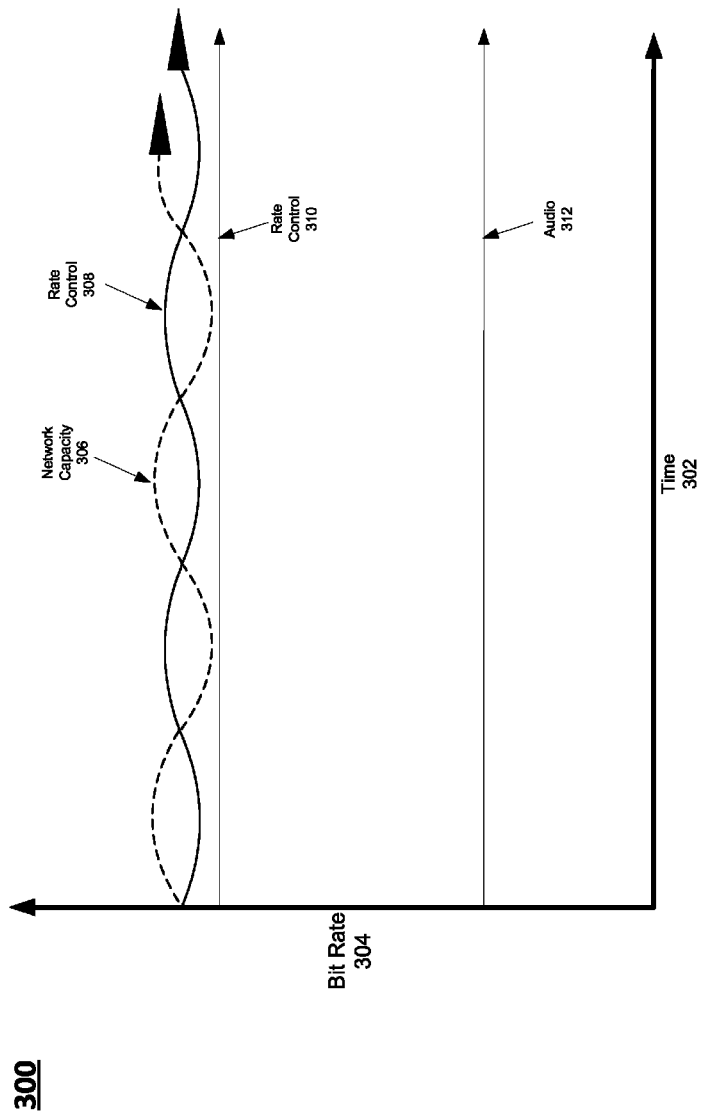
FIG. 3 illustrates a chart for communicating in accordance with embodiments of the present technology.

With reference now to FIG. 3, a chart of data where the vertical axis represents a bit rate, illustrated by bit rate 304, and the horizontal axis represents time, as illustrated by time 302. Network capacity 306 is a line of data that may be gathered by probing module 120 of FIG. 2. Rate control 308 may be data related to a rate limit set by rate controller 125 based on data from probing module 120 or may also represent the bit rate at which data is sent from device 100 to another device. Audio 312 indicates the bit rate at which the audio stream of the communication is transmitted. Audio 312 may maintain a constant low bit rate during the communication. The two points indicated by 314 illustrate where rate control 308 is at a bit rate below the network capacity. At points 314 the communication may be sent from device 100 to another device at a high bit rate that will not experience an error due to exceeding the network optimal bit rate. For example, voice activity detector 130 may detect speech or audio at points 314.

However, 316 illustrates where the variable network capacity decreases relative to points 314 and rate control 308 exceeds the rate control. At point 316, speech or audio may not be detected by voice activity detector 130. Point 316 is an example where the video becomes clearer at a higher resolution but the whole conversation may be poor overall because the video has exceeded the network bandwidth and the audio may be lost. In one embodiment, the rate controller 125 sets the rate limit to rate control 310 which is based on the detection of the presence of the audio stream at points 314. In one embodiment, rate control 310 is a static limit that allows for the network capacity to vary while device 100 is able to send a relatively high resolution video without the risk of losing audio.

It should be noted that the various embodiments described herein can also be used in combination with one another. That is one described embodiment can be used in combination with one or more other described embodiments.

Operations of Communicating

Figure 4:
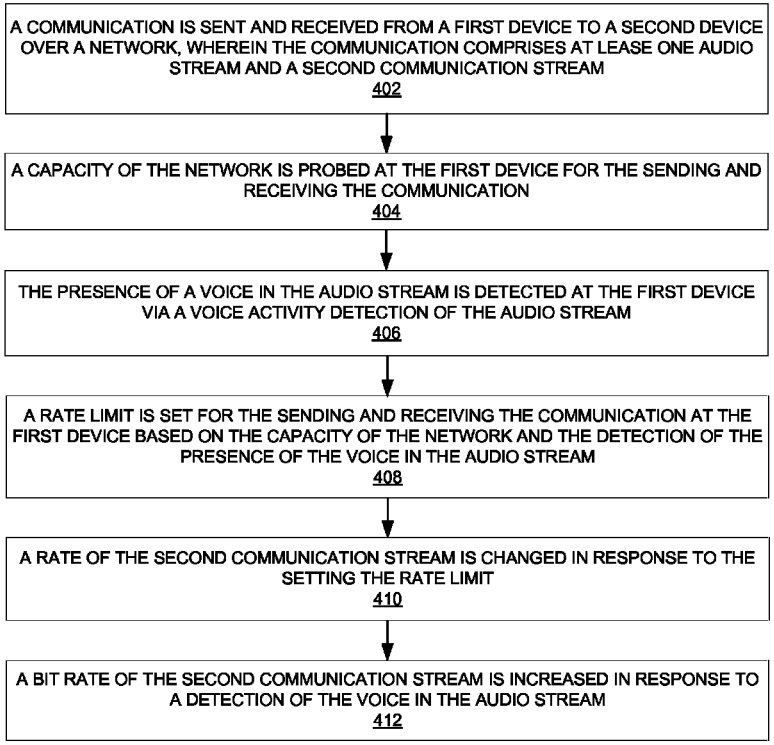
FIG. 4 illustrates a flowchart of an example method for communicating in accordance with embodiments of the present technology.

FIG. 4 is a flowchart illustrating process 400 for communicating in accordance with one embodiment of the present technology. In one embodiment, process 400 is a computer implemented method that is carried out by processors and electrical components under the control of computer usable and computer executable instructions. The computer usable and computer executable instructions reside, for example, in data storage features such as computer usable volatile and non-volatile memory and may be non-transitory. However, the computer usable and computer executable instructions may reside in any type of computer usable storage medium. In one embodiment, process 400 is performed by the components of FIG. 1 or 2.

At 402, a communication is sent and received from a first device to a second device over a network, wherein the communication comprises a at least one audio stream and a second communication stream. For example, the first device may be device 100 of FIG. 1. The communication may have more than one audio stream and more than two streams. The second communication stream may be audio, video, or an animation. The network may be a cellular network and the first and second device may be smart phones or other electronic devices. The communication may be a two way communication.

At 404, a capacity of the network is probed at the first device for the sending and receiving the communication. This may be accomplished by probing module 120 of FIG. 1. The capacity of the network may vary over time and may be probed continuously or at intervals during the communication.

At 406, the presence of a voice in the audio stream is detected at the first device via a voice activity detection of the audio stream. This may be accomplished by voice activity detector 130 of FIG. 1. The detection may detect an actual loss of the voice in the audio stream, may detect the presence of the voice in the audio stream, or may detect a near end of the voice in the audio stream. For example, the voice activity detector may detect a voice at the near end. The detection of the presence of the voice in the audio stream, or the detection of the near end of the voice in the audio stream, may be determined a pre-determined threshold related to the quality of the audio stream. The detection of the presence of the voice may be detected continuously or at intervals during the communication.

At 408, a rate limit is set for the sending and receiving the communication at the first device based on the capacity of the network and the detection of the presence of the voice in the audio stream. This may be accomplished using rate controller 125 of FIG. 1. In one embodiment, the rate limit is a static limit. Setting the rate limit may employ a rate control algorithm that uses network capacity data and data related to the probability of a near end loss. The rate limit may change continuously or at intervals during the communication.

At 410, a rate of the second communication stream is changed in response to the setting the rate limit. Alternatively, 410 may be a change in the rate of the audio stream, or both the audio and the second communication stream.

At 412, a bit rate of the second communication stream is increased in response to the detection of the presence of the voice. Alternatively, 410 may increase or decrease the rate of the audio stream, or both the audio and the second communication stream.

Various embodiments are thus described. While particular embodiments have been described, it should be appreciated that the embodiments should not be construed as limited by such description, but rather construed according to the following claims.

Example Computer System Environment

Portions of the present technology are composed of computer-readable and computer-executable instructions that reside, for example, in computer-usable media of a computer system or other user device such as a smart phone used for video communications. Described below is an example computer system or components that may be used for or in conjunction with aspects of the present technology.

It is appreciated that the present technology can operate on or within a number of different computer systems including general purpose networked computer systems, embedded computer systems, cloud-based computers, routers, switches, server devices, user devices, various intermediate devices/artifacts, stand-alone computer systems, mobile phones, personal data assistants, televisions and the like. The computer system is well adapted to having peripheral computer readable media such as, for example, a floppy disk, a compact disc, and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, a handheld device, a smartphone, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method for communicating, said computer-implemented method comprising:
    sending and receiving a communication from a first device to a second device over a network, wherein said communication comprises at least one audio stream and a second communication stream;
    probing a capacity of said network at said first device for said sending and receiving said communication;
    detecting a presence of a voice in said at least one audio stream at said first device via a voice activity detection; and
    setting a rate limit for said sending and receiving said communication at said first device such that said rate limit is below a lowest measured capacity of said capacity of said network and based on said detecting said presence of said voice in said at least one audio stream.

2. The computer-implemented method of claim 1 further comprising:
    changing a rate of said second communication stream in response to said setting said rate limit.

3. The computer-implemented method of claim 1 further comprising:
    changing a rate of said at least one audio stream in response to said setting said rate limit.

4. The computer-implemented method of claim 1 wherein said second communication stream is selected from the group of communication streams consisting of: an audio stream, a video stream, and an animation.

5. The computer-implemented method of claim 1 wherein said network is selected from the group of networks consisting of: a cellular network, a Wifi network, and a cable network.

6. The computer-implemented method of claim 1 wherein said rate limit is a static limit.

7. The computer-implemented method of claim 1 wherein said setting said rate limit employs a rate control algorithm.

8. The computer-implemented method of claim 1 wherein said capacity of said network is variable over time.

9. The computer-implemented method of claim 1 wherein said communication is a two-way communication between said first device and said second device.

10. The computer-implemented method of claim 1 wherein said detecting said presence of said voice in said at least one audio stream detects an actual loss of said voice.

11. The computer-implemented method of claim 1 wherein said detecting said presence of said at least one audio stream detects a near end of said voice in said at least one audio stream.

12. The computer-implemented method of claim 1 wherein said detecting said presence of said at least one audio stream is accomplished using a digital signal processing (DSP) module associated with said first device.

13. The computer-implemented method of claim 1 wherein said probing said capacity, said detecting said presence, and said setting said rate limit occur continuously during said communication.

14. The computer-implemented method of claim 1 further comprising:
    increasing a bit rate of said second communication stream in response to no detecting of a near end of said voice, wherein said second communication stream is a video stream.

15. A computer-usable storage medium having instructions embodied therein that when executed cause a computer system to perform a method for communication, said method comprising:
    sending and receiving a communication from a first device to a second device over a network, wherein said communication comprises at least one audio stream and a second communication stream;
    probing a capacity of said network at said first device for said sending and receiving said communication;
    detecting a presence of a voice in said at least one audio stream at said first device via a voice activity detection; and
    setting a rate limit for said sending and receiving said communication at said first device such that said rate limit is below a lowest measured capacity of said capacity of said network and based on said detecting said presence of said voice in said at least one audio stream.

16. A device for communicating, said device comprising:
    an image capturing device for capturing images;
    a microphone for capturing audio;
    a transceiver for sending and receiving a communication with a second device over a network, wherein said communication comprises at least one audio stream and a second communication stream;
    a probing module for probing a capacity of said network;
    a voice activity detector for detecting a presence of a voice in said at least one audio stream; and
    a rate controller for setting a rate limit for said transceiver such that said rate limit is below a lowest measured capacity of said capacity of said network and based on said detecting of said presence of said at least one audio stream.

17. The device of claim 16 wherein said rate controller is for changing a rate of said second communication stream in response to said setting said rate limit, wherein said second communication stream is a video stream.

18. The device of claim 16 wherein said rate controller is for changing a rate of said at least one audio stream in response to said setting said rate limit.

19. The device of claim 16 wherein said probing module continuously probes said capacity of said network, said voice activity detected continuously detects for said presence of said voice in said at least one audio stream, and in response, said rate controller continuously changes said rate limit.

20. The device of claim 16 wherein said network is selected from the group of networks consisting of: a cellular network, a Wifi network, and a cable network.

21. The device of claim 16 wherein further comprising:
   a digital signal processing (DSP) module in conjunction with said voice activity detector for said detecting said presence of said voice in said at least one audio stream.

22. The device of claim 16 further comprising:
   a display for displaying a video stream from said second device; and
   a speaker for playing an audio stream from said second device.

* * * * *